US010532313B2

(12) United States Patent
Pust et al.

(10) Patent No.: US 10,532,313 B2
(45) Date of Patent: Jan. 14, 2020

(54) ACTIVATION OF A MATERIAL CONTAINING ALKALINE-EARTH METAL CARBONATE AND ALKALINE-EARTH METAL HYDROXIDE FOR THE DRY SCRUBBING OF FLUE GAS

(71) Applicant: Rheinkalk GmbH, Wülfrath (DE)

(72) Inventors: Christopher Pust, Düsseldorf (DE); Arnd Pickbrenner, Wülfrath (DE); Martin Sindram, Ennepetal (DE)

(73) Assignee: Rheinkalk GmbH, Wülfrath (DE)

( * ) Notice: Subject to any disclaimer, the term of this patent is extended or adjusted under 35 U.S.C. 154(b) by 53 days.

(21) Appl. No.: 15/290,201

(22) Filed: Oct. 11, 2016

(65) Prior Publication Data

US 2017/0120187 A1 May 4, 2017
US 2018/0311612 A9 Nov. 1, 2018

Related U.S. Application Data

(63) Continuation of application No. 14/388,429, filed as application No. PCT/EP2013/056904 on Apr. 2, 2013, now abandoned.

(30) Foreign Application Priority Data

Mar. 30, 2012 (EP) .................................... 12162517

(51) Int. Cl.

| B01D 53/50 | (2006.01) |
|---|---|
| B01D 53/68 | (2006.01) |
| B01J 20/04 | (2006.01) |
| B01J 20/28 | (2006.01) |
| B01J 20/30 | (2006.01) |
| B01D 53/83 | (2006.01) |

(52) U.S. Cl.
CPC ......... *B01D 53/508* (2013.01); *B01D 53/685* (2013.01); *B01D 53/83* (2013.01); *B01J 20/041* (2013.01); *B01J 20/043* (2013.01); *B01J 20/28004* (2013.01); *B01J 20/28016* (2013.01); *B01J 20/3078* (2013.01); *B01D 2253/112* (2013.01); *B01D 2253/304* (2013.01)

(58) Field of Classification Search
CPC ...... B01J 20/041; B01J 20/043; B01J 53/508; B01J 20/3078
USPC ....................................................... 502/400
See application file for complete search history.

(56) References Cited

U.S. PATENT DOCUMENTS

| 4,061,593 A | 12/1977 | Summers |
|---|---|---|
| 7,314,847 B1 | 1/2008 | Siriwardane |

FOREIGN PATENT DOCUMENTS

| CA | 2707959 | 9/2011 |
|---|---|---|
| CN | 85105415 | 7/1985 |
| DE | 2252710 | 5/1974 |
| DE | 3230472 | 2/1984 |
| DE | 102008041530 | 3/2010 |
| DE | 102009045278 | 5/2011 |
| DE | 102011112657 | 3/2013 |
| EP | 0101088 | 8/1983 |
| EP | 0613712 | 9/1994 |
| EP | 0748766 | 10/1998 |
| EP | 0861209 | 8/1999 |
| EP | 2328675 | 5/2013 |
| JP | 7149580 | 6/1995 |
| JP | 2003-164757 | 6/2003 |
| JP | 2006-169062 | 6/2006 |
| JP | 2009-057254 | 3/2009 |
| JP | 2010-064040 | 3/2010 |
| UA | 44170 U | 9/2009 |
| WO | 92/01509 | 2/1992 |
| WO | 2006/113301 | 10/2006 |
| WO | 2011/039034 | 4/2011 |
| WO | 2013/034314 | 3/2013 |
| WO | 2013/034315 | 3/2013 |

OTHER PUBLICATIONS

JP 07149580 Machine Translation.*
A. Duffy et al., "Investigations on the adsorption of acidic gases using activated dolomite", Chemical Engineering Journal (Lausanne, Switzerland), 117(3):239-244, 2006.
R. Pisani, Jr., and D. Moraes, Jr., "Removal of SO2 with particles of dolomite limestone powder in a binary fluidized bed reactor with bubbling fluidization", Brazilian Journal of Chemical Engineering, 20(2):95-103, 2003.
M. Sakai et al., "Simultaneous Removal of SO x and NO x using Slaked Lime at Low Temperature", Industrial & Engineering Chemistry Research, 41(20):5029-5033, 2002.
P. Staszczuk et al., "Investigations on the adsorption properties and porosity of natural and thermally treated dolomite samples", Powder Technology, 92(3):253-257, 1997.
Couple Systems GmbH; DryEGCS Process, Dry Exhaust Gas Cleaning System; Sustanable Shipping Conference 2009 in San Francisco, PowerPoint Presentation.
Fels, A CRH Company; Einspruch EP 2644267 B1 Letter, Elbingerode, Absorptionsversuche der Einsprechenden, Aug. 3, 2018.
Greenwood, Norman N., Chemie der Elemente, 5.3.3 Oxide and Hydroxide, VCH Verlagsgesellschaft mgH 1988 (originally publd in English by Pergamon Press, Oxford, under the title Chemistry of the Elements 1984).
MARPOL 73/78, Annex VI & MEPC. 184(59), Notice of Compliance; Exhaust Gas Cleaning System; CoupleSystems Dry EGCS MA2-113-250-420; Germanischer Lloyd, Issued at Hamburg, Apr. 27, 2010 / Rev. 1.
Weisweiler, W., et al, Dry Limetone and Dolomite Flue Gas Desulfurization: Improvement of Sulfur Dioxide Sorption by Optimum Pore Structure, by Pelletizing and by Chemical Activation of the Sorbent; Projekt Europaisches Forschungszentrum Fur Massnahmen Zur Luftreinhaltung Forschungsbericht Kfk—PEF 31, Kernforschungszentrum Karlsruhe GmbH.

* cited by examiner

*Primary Examiner* — James A Fiorito
(74) *Attorney, Agent, or Firm* — Honigman LLP; Thomas A. Wootton, Esq.; Jonathan P. O'Brien

(57) ABSTRACT

The invention relates to a method for increasing the absorbency of a material containing alkaline-earth carbonate and alkaline-earth hydroxide with regard to sulfur oxides and/or other pollutants, in particular in flue gas, wherein the material containing alkaline-earth carbonate and alkaline-earth hydroxide is activated by heating said material to approximately 250° C. to approximately 750° C. for a time period of 1 minute to 12 hours.

8 Claims, 1 Drawing Sheet

ACTIVATION OF A MATERIAL CONTAINING ALKALINE-EARTH METAL CARBONATE AND ALKALINE-EARTH METAL HYDROXIDE FOR THE DRY SCRUBBING OF FLUE GAS

CROSS-REFERENCE TO RELATED APPLICATIONS

This application is a continuation of U.S. Application Ser. No. 14/388,429, filed Feb. 17, 2015, which claims priority under 35 U.S.C. § 371 to Patent Cooperation Treaty Application No. PCT/EP2013/056904, filed Apr. 2, 2013, which claims the benefit of earlier filed European Application No. 12162517.2, filed Mar. 30, 2012, the contents of which are incorporated herein by reference in their entirety.

The invention relates to a method for increasing the absorbency of a material containing alkaline-earth metal carbonate and/or alkaline-earth metal hydroxide in relation to sulphur oxides and/or other pollutants, particularly in flue gas. The invention furthermore relates to an activated material containing alkaline-earth metal carbonate and/or alkaline-earth metal hydroxide produced by this method, and to the use of this material for off-gas scrubbing, in particular for dry flue gas scrubbing.

Figure 1:
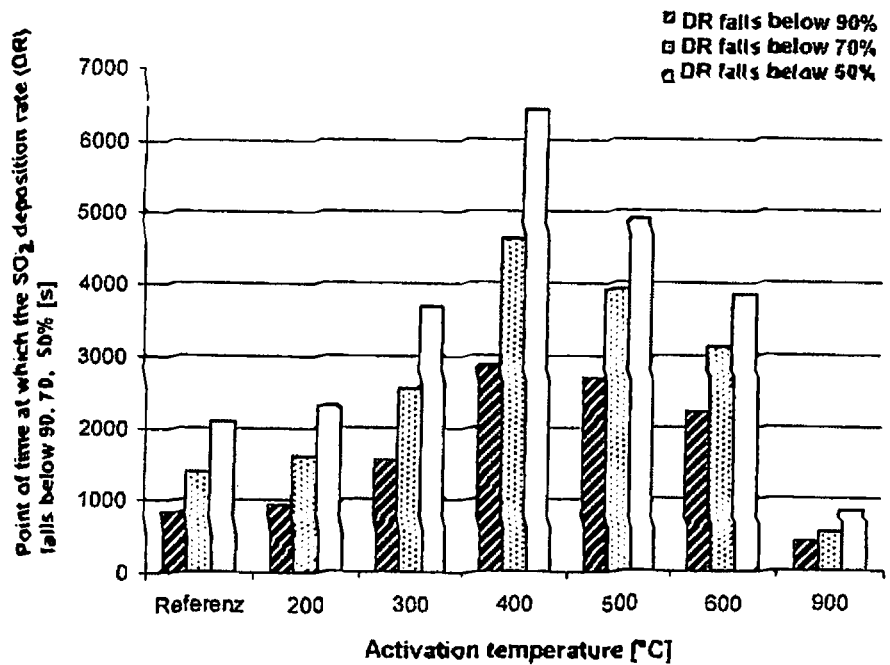
FIG. 1 shows the rate of reduction in the values of the degree of deposition when deposition drops by either 90%, 70% or 50% at temperatures that range from 200° C. to 900° C. Untreated reference material is compared to sample materials at different temperatures.

In the field of off-gas scrubbing, numerous methods are employed. Besides wet off-gas scrubbing, dry off-gas scrubbing is also employed. Materials containing alkaline-earth metal carbonate and/or alkaline-earth metal hydroxide, in particular lime products, are used in various dry flue gas scrubbing processes as sorbents for the deposition of acid-forming off-gas components in various temperature ranges.

The aim is to neutralise the acidic pollutants present in the off-gas flow, such as sulphur dioxide, hydrogen chloride and hydrogen fluoride, and to deposit on suitable deposition devices the neutral salts formed. In this case, for example, bed filters, entrained-flow processes, in conjunction with electro-filters or fabric filters, are used.

Dry off-gas scrubbing is used in different variants. The most essential fields of use are scrubbing the off-gases of coal and lignite power stations, waste incineration plants, hazardous waste incineration plants, heat engines and furnaces with various fuels.

One widespread technique in the temperature range of up to mostly about 200° C. is the bed filter technique. In this case, sorbents based on limestone ($CaCO_3$), in particular granulated or pelleted products based on limestone ($CaCO_3$) and/or lime hydrate ($Ca(OH)_2$), and/or the corresponding dolomitic products are used. In these filters, the off-gas to be scrubbed flows through a granular bed of material containing alkaline-earth metal carbonate and/or alkaline-earth metal hydroxide. Here, deposition of the acidic off-gas components on the material (sorbent) containing alkaline-earth metal carbonate and/or alkaline-earth metal hydroxide takes place.

With the aid of off-gas scrubbing, the off-gases containing pollutants can be very substantially scrubbed. A disadvantage, however, is that the consumption of sorbent containing alkaline-earth metal carbonate and/or alkaline-earth metal hydroxide is very high. The moderate efficiency of dry off-gas scrubbing is attributable to the fact that the sorbents do not react fully through. A layer of reaction products, which makes further penetration of the acidic pollutants to be deposited difficult, is formed on the sorbent.

A deficiency of the bed filter technique is the relatively high consumption for the deposition of sulphur oxides ($SO_2$ and $SO_3$) and the sealing of the reactive surface of the sorbents by the reaction products being formed, for example calcium sulphite ($CaSO_3$) and calcium sulphate ($CaSO_4$).

Attempts have repeatedly been made to reduce the high sorbent consumption. One method consists in mechanically reprocessing the deposited product, which consists of unreacted sorbent and the reaction products formed, after the off-gas scrubbing. The intent and purpose of the mechanical treatment is to separate the unreactive outer layers. Another method provides intermediate storage of the reaction product with reuse after 1-2 days of storage.

All these methods, however, are characterised by insufficient effectiveness in terms of increasing the absorbency of the sorbent.

Increasing the absorbency of the sorbent is intended to mean reducing the amount of sorbent to achieve a particular degree of deposition of the acidic pollutants. A higher absorbency in this case leads to a reduction in the stoichiometric factor.

There is significant interest in producing activated materials containing alkaline-earth metal carbonate and/or alkaline-earth metal hydroxide, which have an increased absorbency in relation to sulphur oxides and/or other pollutants in the flue gas.

This object is achieved according to the invention by a method for increasing the absorbency of a material containing alkaline-earth metal carbonate and/or alkaline-earth metal hydroxide in relation to sulphur oxides and/or other pollutants, particularly in flue gas, in which the material containing alkaline-earth metal carbonate and/or alkaline-earth metal hydroxide is activated by heating to from about 200° C. to about 850° C.

In the context of this invention, a material containing alkaline-earth metal carbonate and/or alkaline-earth metal hydroxide is intended to mean all materials which contain at least one alkaline-earth metal carbonate and/or alkaline-earth metal hydroxide, or consist of one of these substances. In particular, according to the invention a material containing alkaline-earth metal carbonate and/or alkaline-earth metal hydroxide is intended to mean both lime and dolomite derived material. According to a preferred embodiment of the invention, the material containing alkaline-earth metal carbonate and/or alkaline-earth metal hydroxide contains calcium carbonate, calcium hydroxide, magnesium carbonate and/or magnesium hydroxide, or consists of one of these substances.

According to the invention, alkaline-earth metal carbonates are intended to mean all salts and esters of carbonic acid, i.e. in particular secondary carbonates, hydrogen carbonates, orthocarbonates and carbonate esters, which contain an alkaline-earth metal. The alkaline-earth metals include inter alia magnesium, calcium, beryllium, strontium and barium. According to a preferred embodiment of the invention, the alkaline-earth metal carbonate is magnesium carbonate or calcium carbonate, or a mixture thereof. Alkaline-earth metal carbonates particularly suitable according to the invention are present in products derived from lime and/or dolomite. According to a preferred embodiment of the invention, a material based on limestone and/or dolomite is used as the material containing alkaline-earth metal carbonate. For example, unburnt and/or partially burnt lime has been found to be suitable according to the invention. Furthermore, unburnt and/or partially burnt dolomite has been found to be suitable according to the invention. Burnt lime and/or burnt dolomite are likewise suitable.

According to the invention, alkaline-earth metal hydroxides are intended to mean all compounds which contain an alkaline-earth metal and the monovalent group of atoms —OH as a functional group or ion. The alkaline-earth metals include inter alia magnesium, calcium, beryllium, strontium and barium. According to a preferred embodiment of the invention, the alkaline-earth metal hydroxide is magnesium hydroxide or calcium hydroxide, or a mixture thereof. Alkaline-earth metal hydroxides particularly suitable according to the invention are present in products derived from lime and/or dolomite. According to a preferred embodiment of the invention, a material based on lime hydrate (slaked lime) and/or dolomite hydrate is used as the material containing alkaline-earth metal hydroxide. For example, slaked and/or partially slaked lime has been found to be suitable according to the invention. Furthermore, slaked and/or partially slaked dolomite has been found to be suitable according to the invention.

According to a preferred embodiment of the invention, the material contains both alkaline-earth metal carbonate and alkaline earth metal hydroxide.

Surprisingly, it has been found that the deposition capacity of materials containing alkaline-earth metal carbonate and/or alkaline-earth metal hydroxide in relation to acidic gas components, in particular sulphur dioxide in flue gas, can be improved when the material is heated to temperatures of between about 200° C. and about 850° C. Without wishing to be bound by scientific theory, it appears that the heating leads to activation of the sorbents containing alkaline-earth metal carbonate and/or alkaline-earth metal hydroxide. Thus, a significant increase in the absorbency of materials (sorbents) containing alkaline-earth metal carbonate and/or alkaline-earth metal hydroxide is already achieved by single heating to temperatures of between about 200° C. and about 850° C.

By the method according to the invention, the absorbency of a material containing alkaline-earth metal carbonate and/or alkaline-earth metal hydroxide can be increased particularly in relation to sulphur oxides, such as sulphur dioxide ($SO_2$) and/or sulphur trioxide ($SO_3$), and/or other pollutants, in particular hydrogen chloride (HCl) and/or hydrogen fluoride (HF).

The method according to the invention thus allows more effective deposition of pollutants and, hence, minimization of the demand for material (sorbent) containing alkaline-earth metal carbonate and/or alkaline-earth metal hydroxide in dry flue gas scrubbing.

According to a particularly preferred embodiment of the invention, the material contains both alkaline-earth metal carbonate and alkaline-earth metal hydroxide. The proportion of alkaline-earth metal carbonate and alkaline-earth metal hydroxide in the material may vary in wide ranges. The proportion of alkaline-earth metal carbonate in the material preferably varies in the range of from 10 wt. % to 90 wt. %, more preferably from 20 wt. % to 60 wt. %, and in particular from 25 wt. % to 30 wt. %, in each case based on the total amount of material.

For a material containing both alkaline-earth metal carbonate and alkaline-earth metal hydroxide, the proportion of alkaline-earth metal hydroxide in the material preferably varies in the range of from 10 wt. % to 90 wt. %, more preferably from 40 wt. % to 80 wt. %, and in particular from 70 wt. % to 75 wt. %, in each case based on the total amount of material.

According to a preferred embodiment of the invention, the activation of the material containing alkaline-earth metal carbonate and/or alkaline-earth metal hydroxide, in particular of the material containing alkaline-earth metal carbonate and alkaline-earth metal hydroxide, is preferably carried out in air.

Practical tests have shown that a particularly strong increase in the absorbency of the sorbent, can be achieved when the material containing alkaline-earth metal carbonate and/or alkaline-earth metal hydroxide is heated to temperatures of from about 250° C. to about 750° C., preferably from about 250° C. to about 700° C., in particular from about 300° C. to about 500° C. According to the invention, the material containing alkaline-earth metal carbonate and/or alkaline-earth metal hydroxide is preferably heated to temperatures of from about 250° C. to about 750° C. It has been observed that the activation effect according to the invention no longer occurs above about 850° C. This is probably because less readily absorbing burnt products are formed at these temperatures. When using lime-derived material, for example, it has been observed that the less readily absorbing calcium oxide is formed at activation temperatures above about 850° C. When heating to temperatures below 200° C., likewise no significant activation of the alkaline-earth metal carbonate and/or alkaline-earth metal hydroxide was observed.

According to a particularly preferred embodiment of the invention, the level of the activation temperature is selected as a function of the proportion of alkaline-earth metal carbonate and/or alkaline-earth metal hydroxide in the material.

If the proportion of alkaline-earth metal carbonate in the material is more than 50 wt. %, preferably from 55 wt. % to 90 wt. %, and in particular from 60 wt. % to 70 wt. %, then it has been found expedient to set the activation temperature at 5 values of at least 350° C., preferably from 350° C. to 700° C., more preferably from 400° C. to 600° C.

If the proportion of alkaline-earth metal hydroxide in the material is more than 50 wt. %, preferably from 50 wt. % to 90 wt. %, and in particular from 70 wt. % to 75 wt. %, then it has been found expedient to set the activation temperature at values of at most 600° C., preferably from 250° C. to 550° C., more preferably from 350° C. to 450° C.

The heating of the material containing alkaline-earth metal carbonate and/or alkaline-earth metal hydroxide may be carried out in various ways known to the person skilled in the art. For example, the heating may be carried out in a kiln or by passing over hot off-gas in a fluidised bed or fluid bed, or in bed filters.

The duration for which the material containing alkaline-earth metal carbonate and/or alkaline-earth metal hydroxide is heated, and therefore activated, may vary in wide ranges. In particular, it has been found that the optimal activation time depends on the material used and the activation temperature selected. The person skilled in the art can determine the optimal activation parameters, in particular activation time and activation temperature, for a particular material by test runs.

For reasons of energy, it is advantageous to limit the duration of the heating. It has been found particularly expedient to heat the material containing alkaline-earth metal carbonate and/or alkaline-earth metal hydroxide for a duration of from 1 minute to 12 hours, preferably from 10 minutes to 12 hours, particularly preferably from 1 hour to 6 hours, in particular from 2 to 5 hours. According to the invention, the material containing alkaline-earth metal carbonate and/or alkaline-earth metal hydroxide is preferably heated for a duration of from 1 minute to 12 hours. In the case of very fine-grained materials and/or suitable selection of the activation temperature and an optimised heating method, shorter heating times are also possible.

According to one embodiment of the invention, the material containing alkaline-earth metal carbonate and/or alkaline-earth metal hydroxide is activated in a separate step by the method according to the invention before it is used as a sorbent.

Tests have shown that the thermal activation according to the invention also persists when the material containing alkaline-earth metal carbonate and/or alkaline-earth metal hydroxide is cooled again after the activation. According to one embodiment of the invention, accordingly, the activated material containing alkaline-earth metal carbonate and/or alkaline-earth metal hydroxide is cooled to room temperature in a further step.

According to another embodiment of the invention, the material containing alkaline-earth metal carbonate and/or alkaline-earth metal hydroxide is heated in the scope of its use in dry flue gas scrubbing once or continuously to temperatures of from about 200° C. to about 850° C., preferably from about 250° C. to about 750° C., in particular from about 300° C. to about 500° C. The material containing alkaline-earth metal carbonate and/or alkaline-earth metal hydroxide may, according to another embodiment, already be contained in a filter ready for use for the flue gas scrubbing when it is heated, particularly a bed filter or a filter cartridge.

According to the invention, all materials based on limestone and/or dolomite, which are suitable for the deposition of acidic components in flue gas, and in particular sulphur dioxide, are suitable in particular as materials containing alkaline-earth metal carbonate and/or alkaline-earth metal hydroxide. Particularly good results are achieved when using products with a particularly large surface area, derived from lime or dolomite, which are specially developed for flue gas scrubbing. According to a preferred embodiment, calcium hydroxide and/or calcium carbonate, as well as products which partially contain calcium hydroxide and/or calcium carbonate, are used as the material containing alkaline-earth metal carbonate and/or alkaline-earth metal hydroxide.

Practical tests have shown that the thermal activation according to the invention works particularly well for materials which at least partially contain alkaline-earth metal hydroxides. Particularly good activations are reached when the material has an alkaline-earth metal hydroxide content of from 1 to 100 wt. %, for example an alkaline-earth metal hydroxide content of from about 5 to about 25 wt. %, or from about 10 to about 15 wt. %. The alkaline-earth metal hydroxide content may in particular be selected from the group consisting of more than about 5 wt. %, more than about 15 wt. %, more than about 25 wt. % and more than about 50 wt. %. Practical tests have shown that very good thermal activations are likewise achieved with alkaline-earth metal hydroxide contents of from about 60 to about 90 wt. %.

The particle size of the material containing alkaline-earth metal carbonate and/or alkaline-earth metal hydroxide may vary in wide ranges. Particularly good deposition capacities are achieved with granules as well as granulated or pelleted products. The particle sizes of the granules, or granulated or pelleted materials, preferably vary in the range of from about 0.1 to about 50 mm, particularly preferably between about 1 mm and about 10 mm, and in particular between about 2 mm and about 6 mm.

The activated product containing alkaline-earth metal carbonate and/or alkaline-earth metal hydroxide, produced by the method according to the invention, is outstandingly suitable as a sorbent for the absorption of sulphur oxides, in particular sulphur dioxide ($SO_2$) and/or sulphur trioxide ($SO_3$), and/or other pollutants, in dry flue gas scrubbing. Furthermore, the present invention also relates to a product containing alkaline-earth metal carbonate and/or alkaline-earth metal hydroxide produced by the method according to the invention, as well as to its use in off-gas scrubbing, particularly in dry flue gas scrubbing.

Practical tests have shown that particularly good deposition capacities are achieved when the material containing alkaline-earth metal carbonate and/or alkaline-earth metal hydroxide is used as a filler material in a bed filter. In this embodiment of the invention, the gas to be scrubbed flows through a loose granular layer of material containing alkaline-earth metal carbonate and/or alkaline-earth metal hydroxide, which is used as a filter medium. The particle size range of the material containing alkaline-earth metal carbonate and/or alkaline-earth metal hydroxide is preferably between about 0.1 mm and about 10 mm, more preferably between about 2 mm and about 6 mm, in particular between about 3 mm and about 5 mm. In this case either the activation according to the invention may be carried out during operation of the bed filter, or the material containing alkaline-earth metal carbonate and/or alkaline-earth metal hydroxide may be activated beforehand, i.e. before it is used as a sorbent in the bed filter.

The flow speeds in the bed filter may vary in wide ranges. For example, speeds of between 0.1 m/s and 5 m/s may be set. Depending on the required degree of deposition and pressure loss, the layer heights may be up to a few metres. Preferred layer heights lie in the range of from about 100 mm to about 500 mm, in particular from about 200 mm to about 400 mm.

The deposition of particles in bed filters may, according to the invention, take place in a fixed bed (stationary bed), a fluid bed, a migrating bed (moved bed) and a fluidised bed (layer carried by the gas flow). The use of bed filters with 5 a stationary bed is particularly expedient.

According to a preferred embodiment of the invention, the operating temperature in the bed filter is increased to temperatures of more than 200° C., and an increase in the absorbency of the material containing alkaline-earth metal carbonate and/or alkaline-earth metal hydroxide is thus achieved. For many materials containing alkaline-earth metal carbonate and/or alkaline-earth metal hydroxide, a maximum of the effectiveness may be achieved at an activation temperature of about 400° C.

It may be expedient to configure the increase in the operating temperature in the bed filter in such a way that both activation of the material and, simultaneously, a high deposition rate for pollutants, in particular for $SO_2$, are ensured. Against this background, it has been found particularly expedient to set the operating temperature in the bed filter at values of from 130° C. to 150° C., preferably from 280° C. to 370° C.

As an alternative, it is also conceivable to set the operating temperature in the bed filter with a view to optimising the activation of the material and, simultaneously, to minimise the activation time. In this way, the duration during which the deposition rate is possibly not optimal is minimised. Taking into account the fact that, as mentioned above, the optimal activation temperatures depend on the composition of the material, and that the optimal deposition temperatures for $SO_2$ lie in the range of from 280° C. to 370° C., the person skilled in the art can readily determine the optimal relationships of activation temperature and activation time.

As shown in FIG. 1, in the case of an increase in the activation temperature with subsequent use of the activated material as a filter material in the bed filter, a substantial improvement in the deposition capacity takes place. A maximum of the effectiveness is in this case achieved at about 400° C.

According to another embodiment according to the invention, however, it is likewise possible to carry out the heating of the material containing alkaline-earth metal carbonate and/or alkaline-earth metal hydroxide directly in the bed filter.

Operating temperatures of from about 200° C. to about 500° C., preferably from about 220° C. to about 400° C., in particular from about 250° C. to about 380° C., have been found to be expedient for this use.

For energy reasons, however, according to the invention it is preferred to heat the material containing alkaline-earth metal carbonate and/or alkaline-earth metal hydroxide before its use, for example once, to a temperature of between about 200° C. and about 850° C.

The essential advantages of this procedure according to the invention are as follows:

1. The method is energy-efficient, since the filter does not have to be operated constantly at high temperatures. By suitable setting of the activation temperature and activation time as a function of the composition of the sorbent, the energy balance can be optimised.

2. The filter can be operated as before at the conventional low temperatures below 200° C., and therefore more cost-efficiently.

3. The activation by heating may be carried out either at the manufacturer of the material (sorbent) containing alkaline-earth metal carbonate and/or alkaline-earth metal hydroxide, or by single periodic heating in the filtering process.

4. The demand for material containing alkaline-earth metal carbonate and/or alkaline-earth metal hydroxide can be minimised by more effective deposition.

The method according to the invention will be explained in more detail below with the aid of exemplary embodiments.

EXAMPLE 1

In a laboratory test, the effect of thermal activation on the absorbency of a sorbent for dry flue gas scrubbing was studied. A sorbent was used consisting of granules that contain about 90 wt. % calcium carbonate and about 10% wt. % lime hydrate. First, the sorbent was divided into 7 batches of 200 g. The first batch was used as a reference sample, and was not treated further. Batches 2 to 7 were stored for 6 hours in correspondingly thermally regulated kilns at 200° C., 300° C., 400° C., 500° C., 600° C. or 900° C. The differently activated sorbents were subsequently cooled to room temperature and the cartridge, respectively provided therefor, of a 160 ml laboratory bed filter was filled therewith. For each material, the absorbency was then determined in comparison with the reference material by recording $SO_2$ permeation curves in the laboratory bed filter. To this end, the bed filters filled with the sample material activated at different temperatures, or reference material, were flowed through at 160 to 170° C. by a likewise thermally regulated $N_2/SO_2$ test gas mixture with an $SO_2$ concentration of 2000 ppm. The gas in this case flowed through the filter with a speed of 0.1 m/s at a pressure of about 30 to 60 mmWC (residence time about 2 s). Arranged downstream of the filter there was a computer-assisted continuous gas analysis unit (company MSI, Type MSI 2000), which recorded the $SO_2$ concentration in the flow through the filter. The difference between the $SO_2$ concentration before the filter (2000 ppm) and after the filter was calculated as the degree of deposition. At time zero, the degree of deposition in all cases was 100%, i.e. the filter material was capable of fully retaining the $SO_2$ in the test gas flowing through. Beyond a certain time, however, a reduction in the degree of deposition was found, i.e. permeation of $SO_2$ in the flow through the filter, which is probably due to gradual saturation of the sorbent with $SO_2$. The greater the absorbency of the sorbent is, the longer $SO_2$ in the test gas is retained in the filter, and the slower the reduction in the values of the degree of deposition, or of the $SO_2$ permeation takes place. Characteristic values are the times after the start of the test at which the degree of deposition has fallen below 90%, 70% or 50%. These values are plotted in FIG. 1 for the untreated reference material and the sample materials activated at different temperatures. Surprisingly, it was found that single thermal activation of the sorbent already led to a strong increase in the absorbency. Thus, a material which has been activated at 400° C. shows an increase in the $SO_2$ absorbency by about 200% compared with the reference material. Even with an activation temperature of only 200° C., slight improvements in the absorbency of the material activated in this way were found. With an activation temperature of 900° C., on the other hand, the absorbency was degraded. Best results were achieved with activation temperatures of from 200 to 600° C., and in particular from 300 to 500° C.

EXAMPLE 2

Figure 2:
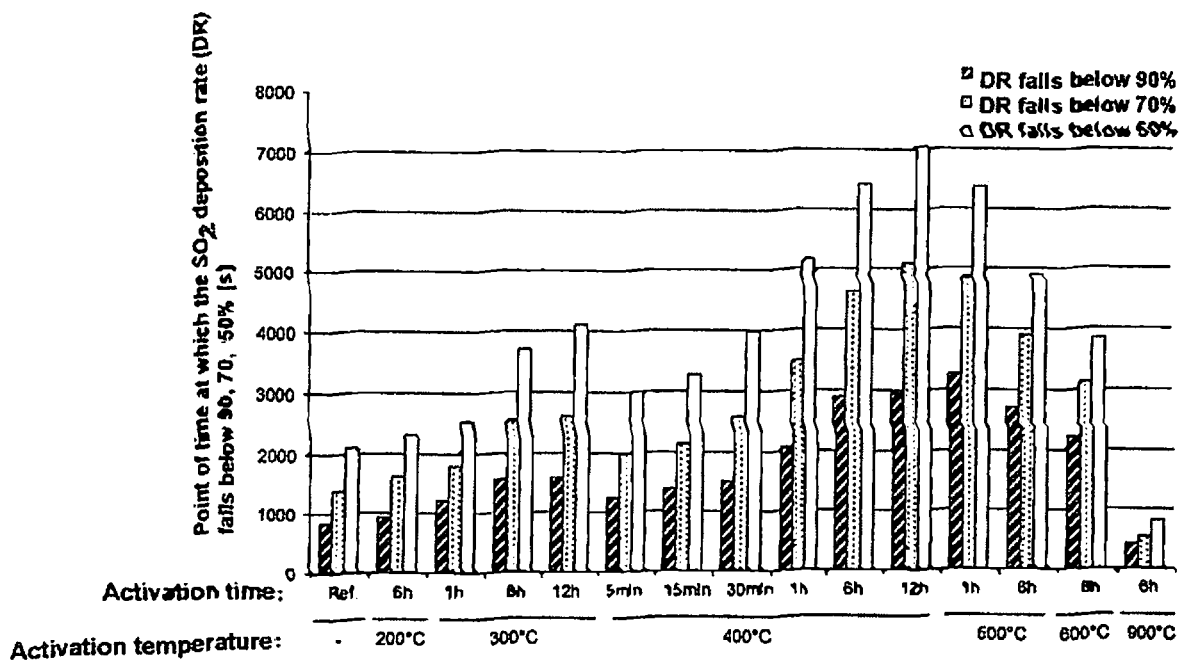
FIG. 2 shows how the $SO_2$ absorbency varies when the materials are activated for different lengths of time and at different temperatures.

In a second test run, the effect of the activation time on the absorbency of the material was studied. To this end, a procedure corresponding to the conduct of the experiments according to Example 1 was adopted. Merely the activation time (residence time in the kiln) was varied. In accordance with Example 1, the $SO_2$ absorbency of the materials activated for different lengths of time and at different temperatures was studied. The results and the activation conditions are shown in FIG. 2. In this case, it is found that, the closer the activation temperature is to 400° C., the shorter are the activation times required in order to achieve a relatively good absorbency. For instance, 30-minute activation at 400° C. shows approximately the same improvement in the absorbency as 12-hour activation at 300° C. The tests furthermore show that, with an optimal activation temperature, short activation times (see FIG. 2, 5-minute activation at 400° C.) already lead to significant improvements in the absorbency compared with the reference material. For many activation temperatures, a further improvement in the absorbency is shown with an increasing activation time (cf. FIG. 2, 300° C. and 400° C.). For an activation temperature of 500° C., on the other hand, 1-hour activation leads to better results than 6-hour activation. As in Example 1, the material activated at 900° C. showed inferior absorbency than the reference material.

EXAMPLE 3

A bed filter filled with a sorbent containing alkaline-earth metal carbonate and alkaline-earth metal hydroxide in a thermal power station was activated once by gas at a temperature of 400° C. flowing through for 2 hours. The bed filter was subsequently operated at a regular operating temperature below 200° C. The thermal activation leads to an improvement in the pollutant absorbency of the bed filter by up to 300%.

EXAMPLE 4

Gas at a temperature of 270° C. flows through granules of $CaCO_3$ and $Ca(OH)_2$ in an industrial fluid-bed process, the granules thereby being dried and hardened. By lengthening the residence time, the material was hooted beyond the drying point to the hot gas temperature, and thereby activated. In this way, it was possible to achieve a 50% improvement in the pollutant absorbency.

What is claimed is:

1. A method for increasing the absorbency of a material containing alkaline-earth metal carbonate and alkaline-earth metal hydroxide in relation to sulphur oxides, in particular sulphur dioxide (SO2) and/or sulphur trioxide (SO3), and/or other pollutants, in particular hydrogen chloride (HC1) and/or hydrogen fluoride (HF), particularly in flue gas, wherein the material consists essentially of alkaline-earth metal carbonate and alkaline-earth metal hydroxide wherein said alkaline-earth metal hydroxide content is from about 5 to about 25 wt. % and is activated by heating to from about 300° C. to about 500° C. for a duration of from 1 hour to 6 hours prior to use to give an activated material containing alkaline-earth metal carbonate and from about 5 to about 25 wt. % alkaline-earth metal hydroxide.

2. The method according to claim 1, wherein in the material containing alkaline-earth metal carbonate and alkaline-earth metal hydroxide, the alkaline-earth metal carbonate is magnesium carbonate, calcium carbonate, or a mixture thereof and/or the alkaline-earth metal hydroxide is magnesium hydroxide, calcium hydroxide, or a mixture thereof.

3. The method according to claim 1, wherein the material containing alkaline-earth metal carbonate and alkaline-earth metal hydroxide contains lime and/or dolomite.

4. The method according to claim 1, wherein the material containing alkaline-earth metal carbonate and alkaline-earth metal hydroxide is in the form of granulate, granules or pellets.

5. The method according to claim 1, wherein the material containing alkaline-earth metal carbonate and alkaline-earth metal hydroxide has an average particle size of from about 0.1 to about 50 mm.

6. The method according to claim 1, wherein the activated material containing alkaline-earth metal carbonate and alkaline-earth metal hydroxide is cooled to room temperature in a further step.

7. The method according to claim 1, wherein the material containing alkaline-earth metal carbonate and alkaline-earth metal hydroxide is in a filter, in particular a bed filter or a filter cartridge.

8. The method according to claim 5, wherein the material containing alkaline-earth metal carbonate and alkaline-earth metal hydroxide has an average particle size of from about 1 to about 10 mm.

* * * * *